May 30, 1950   S. E. HEDSTRÖM   2,509,864
ELECTROMAGNETIC AMPLIFIER
Filed June 19, 1946

Inventor
Sven Eric Hedström
By James Aiken
Attorney

Patented May 30, 1950

2,509,864

UNITED STATES PATENT OFFICE 2,509,864

ELECTROMAGNETIC AMPLIFIER

Sven Eric Hedström, Ludvika, Sweden, assignor to Allmanna Svenska Elektriska Aktiebolaget, Vasteras, Sweden, a Swedish corporation Application June 19, 1946, Serial No. 677,669
In Sweden June 25, 1945

3 Claims. (Cl. 323—89)

It is known to amplify a direct current, flowing alternatively in different directions, by causing it to influence two self-magnetized direct current saturable reactors polarized in different directions and so connected as to produce the difference between their rectified alternating currents. This differential current will then be an amplified reproduction of the primary influencing direct current as regards magnitude as well as direction.

According to the present invention, a considerable increase of the amplification is obtained in such an amplifier with the sacrifice of a small power by causing the differential current to influence also the two reactors in the same direction as the external (primary) magnetisation. The action will in this way be quite another than by the also known connection, in which the reactors are not self-magnetized but only influenced by the differential current in addition to a polarizing current and the primary direct current. In this case the differential current opposes the external magnetisation in one of the reactors and co-operates therewith in the other reactor, which makes it necessary that its ampere-turns shall not exceed a certain value, in order that the polarity of the reactor shall not be reversed. It is also especially important that the differential current, the power of which is smaller than the power of each of the component currents, is loaded by the smallest possible power, which is the case if the self-magnetisation is made independent thereof.

As the amplification characteristic of the saturable reactor is, as a rule, somewhat curved, the action of the present invention can be further improved by introducing some curvature of the characteristic representing the influence of the differential current on the reactors. This can be accomplished by means of voltage-dependent resistances, either so that a resistance, in which the current rises slower than the voltage, is connected in parallel to the winding influenced by the differential current, or so that the said winding is connected in series with a resistance, in which the current rises more rapidly than the voltage, and the whole connected in parallel to the load of the differential current.

Figure 1:
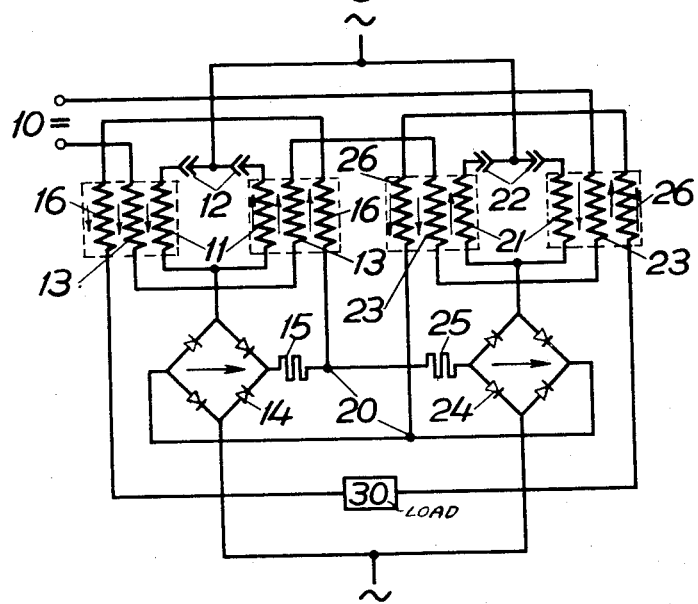
Figure 2:
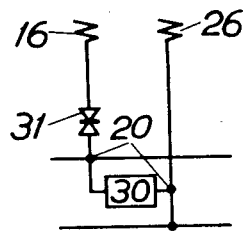
Figure 3:
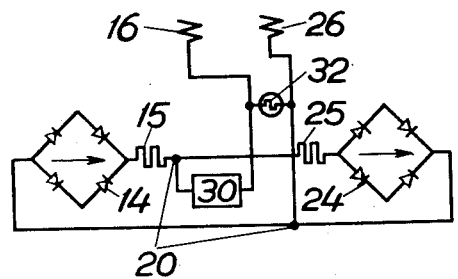
Figure 4:
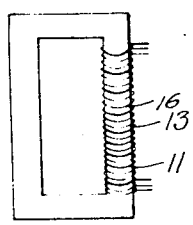

Three forms of the invention are illustrated in the accompanying drawing, in which Fig. 1 shows the complete diagram of connections for one form, while Figs. 2 and 3 show modifications of a detail of Fig. 1. Fig. 4 shows one of the cores and sets of coils associated therewith.

In Fig. 1 the numerals 11 and 21 designate the alternating current windings of two direct current saturable reactors, each of which is internally self-magnetized by means of a pair of unidirectional valves 12, 22, respectively, said valves only admitting one half-wave of the alternating current through each half of the winding. Each reactor preferably has two cores and two sets of coils, each such core and set of coils being, in one possible embodiment, of the type shown in Fig. 4. Each core and set of coils is enclosed in a broken line box in Fig. 1. Instead of this, an external self-magnetisation may of course be employed. The external primary direct current traverses a pair of windings 13, 23 on each of the reactors. The alternating currents are, in the form shown, rectified in separate rectifiers 14, 24, but the reactors may also be provided with their own direct current terminals by connecting unidirectional valves also between the windings 11, 21 and the lower alternating current terminals. The arrangement illustrated, including internal rectifiers for the self-magnetisation and external ones producing the differential current, has however the advantage that the self-magnetisation, in which it is especially important to keep the leakage current of the rectifiers low, can be performed by means of valves thus dimensioned or selected as to make the leakage current particularly low, while the valves employed for producing the differential current, in which the leakage current is of inferior importance, may be higher loaded as regards voltage or selected of a type having comparatively higher leakage current. The rectified alternating currents traverse resistances 15, 25 and form a closed circuit, from which the differential current is tapped in two points 20. Between these points, the amplifying windings 16, 26 mounted on the reactors according to the present invention and the load 30, in which the amplified direct current is utilized, are connected in series.

If the primary direct current flows for instance from the lower direct current terminal 10 to the upper one, it co-operates with the self-magnetisation in the left reactor, whereby the current of this reactor will predominate at the points 20. The differential current will then further increase the action of the left reactor. If the primary direct current instead flows from the upper terminal to the lower one, the right reactor will predominate, and the differential current will still increase this action.

In Fig. 2, only the branching points 20, the load 30, and part of the windings 16, 26 are indicated, while the details which are not shown are supposed to correspond exactly to Fig. 1. The load 30 is connected in parallel to the current path through the windings 16, 26, and the said current path contains a voltage-dependent resistance 31, the current of which rises more rapidly than the voltage. The current in the windings 15, 26 is then better adapted to the curved characteristic of the reactors, whereby the amplification is increased. A similar action is obtained according to Fig. 3 by connecting a resistance 32, in which the current rises slower than the voltage, for instance an incandescent lamp resistance, in parallel to the windings 16, 26, which are here connected in series with the load 30, as in Fig. 1.

I claim as my invention:

1. An electromagnetic amplifier comprising means forming two current paths adapted to be connected to a source of alternating current, a pair of direct current saturable reactors each including a winding in one of said current paths, said reactors being self-magnetized and being polarized in different directions, a source of direct current, a second winding in each reactor connected to said direct current source, rectifiers each having its alternating current terminals connected in one of said paths in series with the reactor winding therein, means forming a current path with the direct current terminals of said rectifiers in series therein, and means forming a branch current path connected to said last path and traversed by the differential current of said rectifiers, said reactors each including a third winding in said branch current path.

2. An electromagnetic amplifier comprising means forming two current paths adapted to be connected to a source of alternating current, means in each of said paths forming two parallel sub-paths, a pair of direct current saturable reactors, each reactor including windings one in each of the sub-paths of one of said current paths, unidirectional valves one in each sub-path in series with the winding therein, said reactors being polarized in different directions, a source of direct current, a second pair of windings in each reactor associated with the first windings thereof and connected to said direct current source, rectifiers each having its alternating current terminals connected in one of said paths in series with the sub-path therein, means forming a current path with the direct current terminals of said rectifiers in series therein, and means forming a branch current path connected to said last path and traversed by the differential current of said rectifiers, said reactors each including third windings associated with each of the first and second windings and connected in said branch current path.

3. An electromagnetic amplifier comprising means forming two current paths adapted to be connected to a source of alternating current, a pair of direct current saturable reactors each including a winding in one of said current paths, said reactors being self-magnetized and being polarized in different directions, a source of direct current, a second winding in each reactor connected to said direct current source, rectifiers each having its alternating current terminals connected in one of said paths in series with the reactor winding therein, means forming a current path with the direct current terminals of said rectifiers in series therein, means forming a branch current path connected to said last path and traversed by the differential current of said rectifiers, said reactors each including a third winding connected in said branch current path, and a voltage dependent resistance connected in said branch current path.

SVEN ERIC HEDSTRÖM.

REFERENCES CITED

The following references are of record in the file of this patent:

UNITED STATES PATENTS

| Number | Name | Date |
|---|---|---|
| 1,434,346 | Jonas | Oct. 31, 1922 |
| 2,169,093 | Edwards | Aug. 8, 1939 |
| 2,265,930 | Scott | Dec. 9, 1941 |
| 2,338,423 | Geyger | Jan. 4, 1944 |
| 2,373,383 | Christopher | Apr. 10, 1945 |
| 2,399,185 | Hedding | Apr. 30, 1946 |

FOREIGN PATENTS

| Number | Country | Date |
|---|---|---|
| 228,082 | Switzerland | Oct. 16, 1941 |